United States Patent [19]
Noritake et al.

[11] Patent Number: 5,876,014
[45] Date of Patent: Mar. 2, 1999

[54] MOTOR DAMPER

[75] Inventors: Seiichiro Noritake; Yoshinori Shinohara, both of Nagano, Japan

[73] Assignee: Sankyo Seiki Mfg Co., Ltd., Nagano-ken, Japan

[21] Appl. No.: 704,911

[22] Filed: Aug. 30, 1996

[30] Foreign Application Priority Data

Sep. 13, 1995 [JP] Japan ................................ 7-260882
Feb. 16, 1996 [JP] Japan ................................ 8-054201

[51] Int. Cl.$^6$ ................................................ F16K 31/02
[52] U.S. Cl. ........................ 251/129.12; 251/303; 62/187; 62/408
[58] Field of Search ..................... 251/129.11, 129.12, 251/313, 303; 62/187, 408

[56] References Cited

U.S. PATENT DOCUMENTS

| | | | |
|---|---|---|---|
| 3,108,452 | 10/1963 | Breen | 62/187 |
| 3,288,370 | 11/1966 | Mingrone et al. | 62/187 |
| 3,793,847 | 2/1974 | Scarlett et al. | 62/408 |
| 4,009,591 | 3/1977 | Hester | 62/187 |
| 4,205,783 | 6/1980 | Dietsche et al. | 251/313 |
| 4,527,734 | 7/1985 | Swain et al. | 62/187 |
| 4,614,092 | 9/1986 | Kim et al. | 62/187 |
| 4,642,998 | 2/1987 | Kang et al. | 62/187 |
| 4,646,531 | 3/1987 | Song | 62/187 |
| 4,689,966 | 9/1987 | Nonaka | 62/187 |
| 4,852,361 | 8/1989 | Oike | 62/187 |
| 4,892,286 | 1/1990 | Reinicke et al. | 251/129.11 |
| 4,957,274 | 9/1990 | Hood et al. | 251/129.12 |
| 5,018,364 | 5/1991 | Chestnut et al. | 251/129.11 |
| 5,083,744 | 1/1992 | Reinicke et al. | 251/129.11 |
| 5,201,888 | 4/1993 | Beach, Jr. et al. | 62/187 |
| 5,361,596 | 11/1994 | Martin | 251/303 |

FOREIGN PATENT DOCUMENTS 2700928   7/1977   Germany ..................... 251/129.11

*Primary Examiner*—Henry Bennett
*Assistant Examiner*—John Ball
*Attorney, Agent, or Firm*—McAulay Nissen Goldberg Kiel & Hand, LLP

[57] ABSTRACT

A motor damper arranged in a passage in a refrigerator through which the cold air flows comprises a frame constituting a part of the passage, a cold air gate formed at the center of the frame, a baffle rotatably secured on a rotation shaft formed on the frame for opening and closing the cold air gate and a rotation mechanism for swinging the baffle between open and closed positions of the cold air gate. The baffle is arranged to enclose a neighboring region by the frame at the position it closes the cold air gate. The rotation mechanism includes a motor arranged outside the frame and in the vicinity of the rotation shaft of the baffle. The motor damper also includes an output shaft of the motor which is rotatably secured to the rotation shaft of the baffle.

13 Claims, 16 Drawing Sheets

FIG. 4A
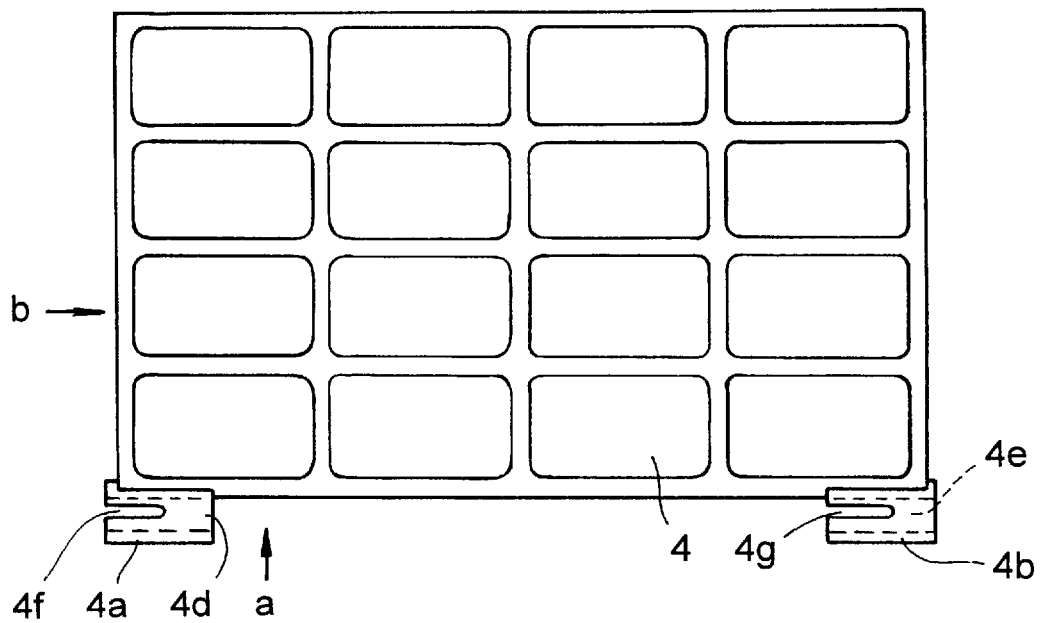
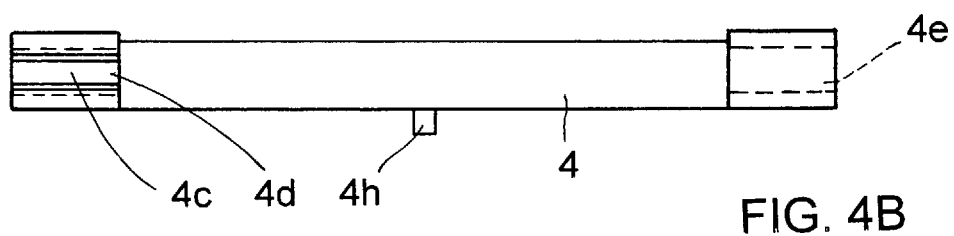
FIG. 4B
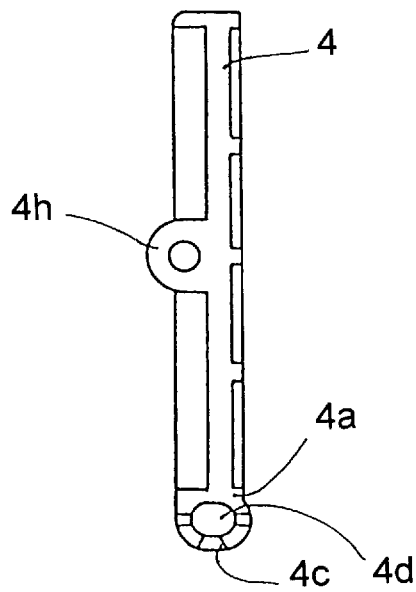
FIG. 4C

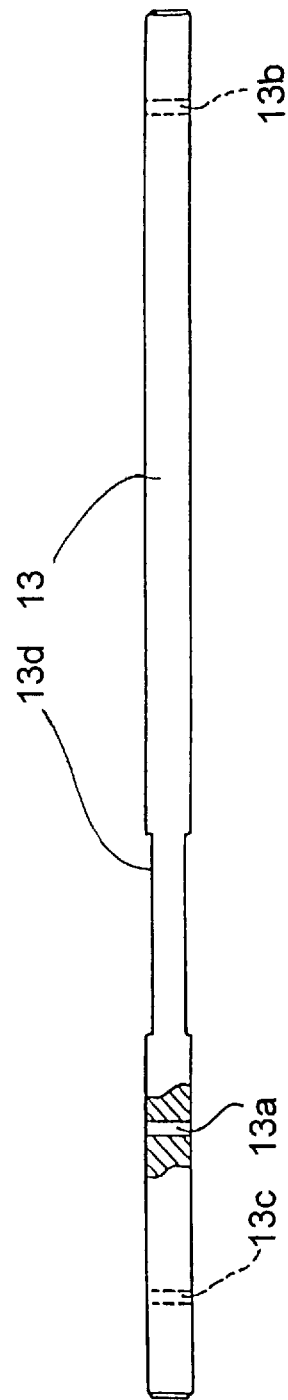
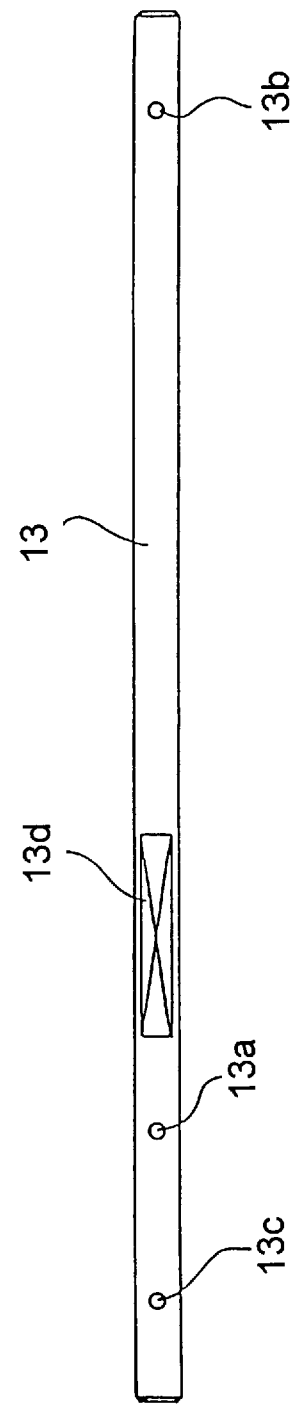

MOTOR DAMPER

BACKGROUND OF THE INVENTION a) Field of the Invention

This invention relates to a motor damper that is arranged in a passage for cold air in a refrigerator and actuates a baffle using a motor as a driving source to control the cold air supply.

b) Description of the Related Art

A conventional motor damper is disclosed in, for example, Japanese patent laid open H6-109354 or U.S. Pat. No. 4,644,239.

FIGS. 13 and 14 show a damper 500, disclosed in the above mentioned Japanese patent H6-109354, comprising a baffle 52 for controlling the cold air supply and a driving mechanism 53 such as a motor which drives the baffle 52.

The baffle 52 is controlled by the driving mechanism 53 such that it swings with a journal 51 as a fulcrum and opens or closes a cold air gate 54 by contacting and retracting from it.

The motor damper 500 is arranged in a passage 67 for cold air in a refrigerator 60 as illustrated in FIG. 15, so that the cold air flows into the refrigerating chamber 62.

Also, FIGS. 16(*a*) and (*b*) illustrate a motor damper 500' disclosed in U.S. Pat. No. 4,644,239.

The damper 500' is comprised of a cam 57' which rotates integrally as the motor 53' spins, a pin 58' arranged eccentrically from the rotational center of the cam 57', and a wall 59' formed on the baffle 52', sandwiching the eccentric pin 58'. As the eccentric pin 58' contacts and retracts from the wall 59', the baffle 52' pivoting around the journal 51' converts the movement into a swinging movement at the cold air gate 54' for closing and opening the cold air gate 54'.

The conventional motor damper 500 opens/closes the baffle 52 pivoting around the journal, so it does not open up to a position parallel to the cold air flow in the passage 57. As FIG. 15 shows, the slanted position becomes the position to open the cold air gate 54, and opens no further.

In the same manner, in the conventional motor damper 500', a distance between the journal 51' of the baffle 52' and the eccentric pin 58' is so long and the rotational distance of the eccentric pin 58' is so short that the baffle 52' does not swing very much.

For this reason, in the conventional motor damper 500 and 500', the baffle 52 and 52' resists the flow of cold air, thus providing the inefficient structure for prompt diffusion of the cold air.

In order to swing the baffle 52 over a large distance in the damper 500 illustrated in FIGS. 13 and 14, the rotational distance of the rack of the driving mechanism 53 needs to be long.

Also, in the damper 500' illustrated in FIG. 16, the moving distance of the eccentric pin 58' needs to be long. Thus, both dampers 500 and 500' are large.

In addition, due to the above mentioned structure as illustrated in FIG. 15, the inward projection width M of the refrigerator 60 is naturally large, thus providing a factor which reduces the capacity of the refrigerator 60.

OBJECT AND SUMMARY OF THE INVENTION

The primary object of this invention is to solve the problems mentioned above and to provide a motor damper which is miniaturable and does not hinder the cold air flow.

In accordance with the invention, a motor damper arranged in a passage in a refrigerator through which the cold air flows comprises a frame constituting a part of the passage, a cold air gate formed at the center of the frame, a baffle rotatably secured on a rotation shaft formed on the frame for opening and closing the cold air gate and a rotation mechanism for swinging the baffle between open and closed positions of the cold air gate. The baffle is arranged to enclose a neighboring region by the frame at the position it closes the cold air gate. The rotation mechanism includes a motor arranged outside the frame and in the vicinity of the rotation shaft of the baffle. The motor damper also includes an output shaft of the motor which is rotatably secured to the rotation shaft of the baffle.

BRIEF DESCRIPTION OF THE DRAWINGS

In the drawings:

FIGS. 4(A), 4(B) and 4(C) show the baffle used in the first embodiment: FIG. 4(A) is its plan view; FIG. 4(B) is its front view seen from the direction of an arrow a in FIG. 4(A); FIG. 4(C) is its view seen from the direction of an arrow b;

FIGS. 5(A) and 5(B) show the shaft used in the first embodiment: FIG. 5(A) is its front view; FIG. 5(B) is its plan view;

DESCRIPTION OF THE PREFERRED EMBODIMENTS

Figure 1:
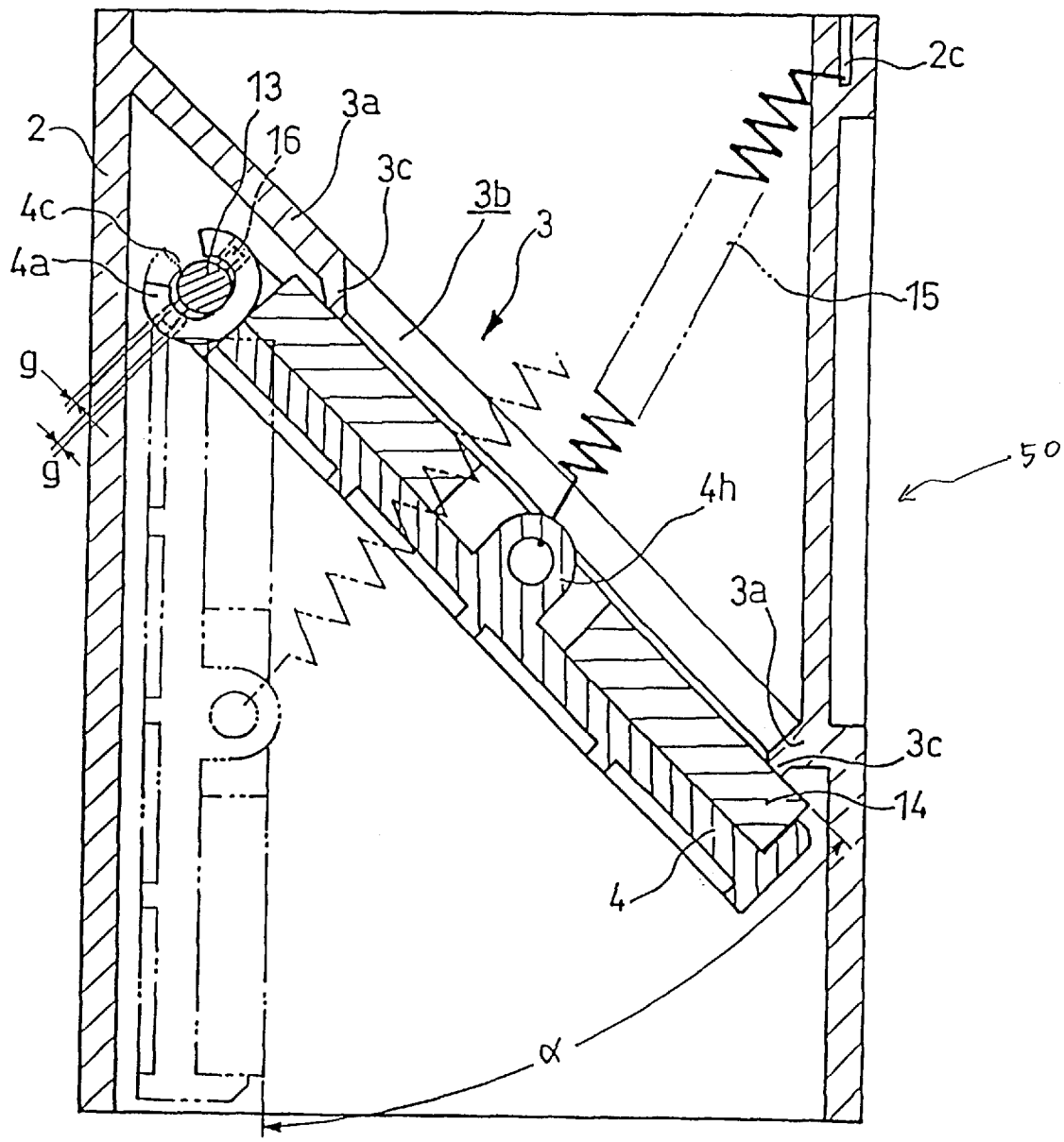
FIG. 1 shows the first embodiment showing an I—I cross-section of FIG. 2.
Figure 2:
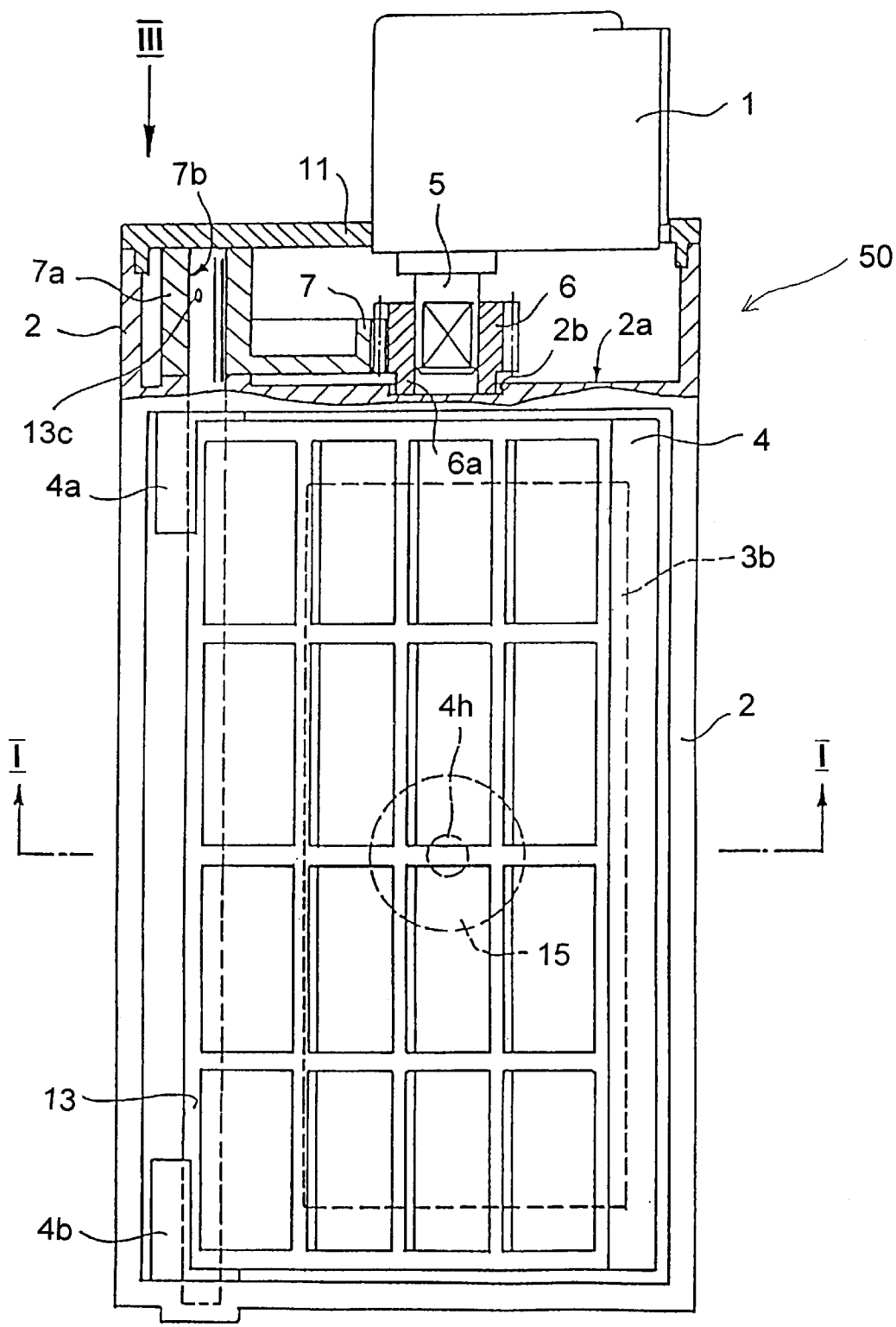
FIG. 2 shows a partial cross-sectional bottom view of FIG. 1.
Figure 3:
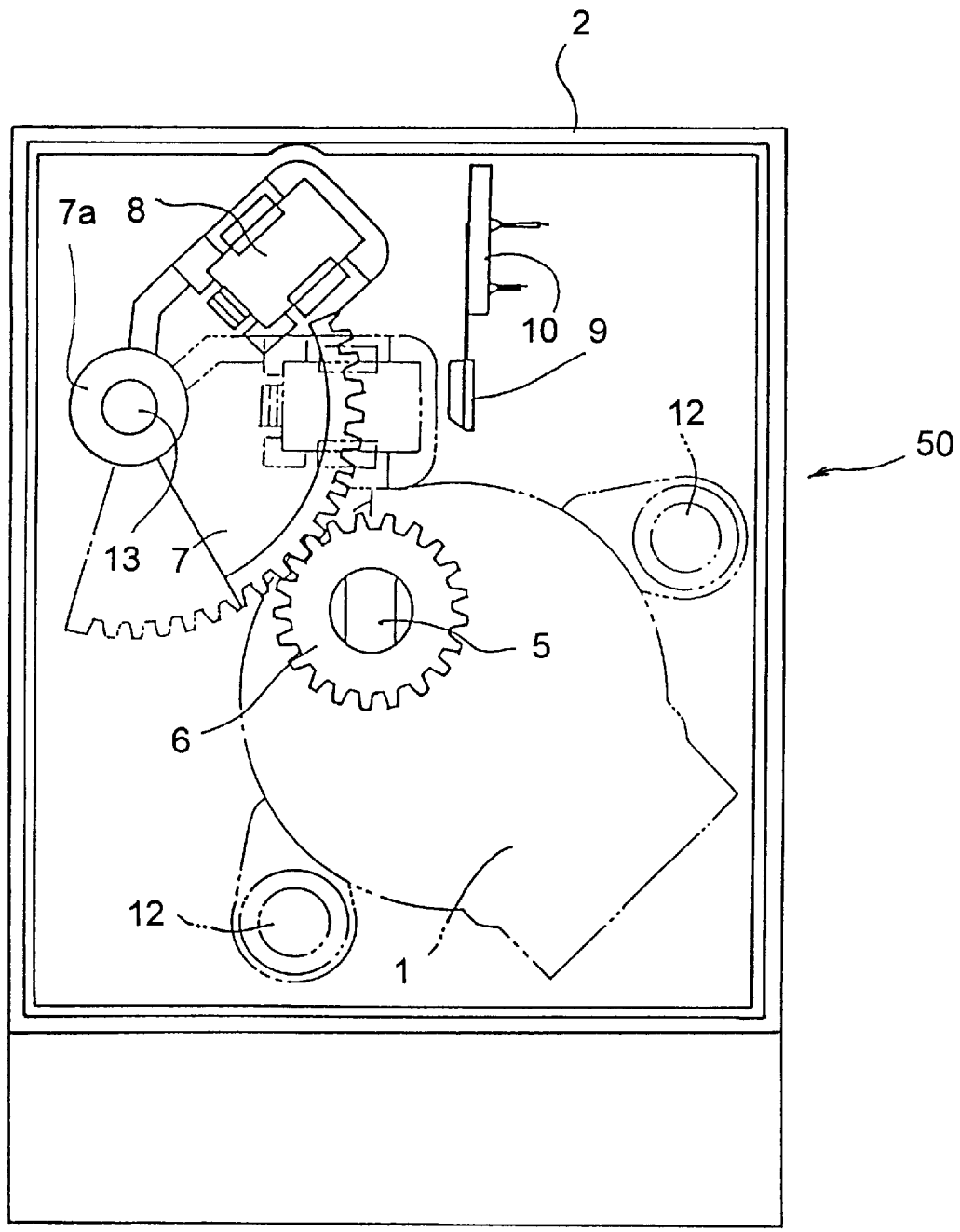
FIG. 3 is a diagram showing the status in which a cover is removed and a stepping motor is imaginary added thereto, viewing from the III direction of FIG. 2.

The first embodiment of this invention is now described which is based on FIGS. 1 through 6.

A motor damper 50 is comprised of a stepping motor 1 which is a driving source, a frame 2 constituting a part of the passage, a cold air gate 3 formed at the center of the frame 2, and a baffle 4 which swings to contact and retract from the cold air gate 3.

The stepping motor 1 has an output shaft 5 made of stainless steel (SUS) which a pinion 6 made of polyacetal (denoted as POM hereafter) fits.

The bottom 6a of the shaft of the pinion 6 bears on a concavity 2b formed at the side section 2a of the frame 2.

The pinion 6 engages with a fan-like gear 7 which is a decelerating gear, and transmits the rotational movement from the stepping motor 1 thereto.

Note that the fan-like gear 7 of the first embodiment is made of the same material, POM, as the pinion 6. The angles of the teeth of the fan-like gear 7 are set according to the moving angle of the baffle 4.

A magnet 8 made of isotropic ferrite magnet is attached to one end of the fan-like gear 7.

In the vicinity of the magnet 8, a hall IC (sensor) 9 for detecting the approach of the magnet 8 is attached to the frame 2 via a printed circuit board.

A through hole 7b is formed on the rotational center 7a of the fan-like gear 7, and a shaft made of SUS is fit thereto.

The shaft 13 is fixed to the shaft units 4a and 4b via pins 16.

The stepping motor 1, the output shaft 5, the pinion 6, the fan-like gear 7, and the shaft 13 constitute a movement mechanism for swinging the baffle 4.

Also, by decelerating the stepping motor 1, the fan-like gear 7 increases the rotation torque and transmits the movement to the baffle 4 side. Therefore, even if the motor is miniaturized, it still swings the baffle 4 efficiently.

A cover 11 made of ABS resin is attached to the frame 2 via screws 12 and 12 and covers the above mentioned movement mechanism.

In the first embodiment, only the stepping motor 1 in the movement mechanism projects outside the cover 11; other components of the movement mechanism are covered with the cover 11 and isolated from the outside.

The frame 2 made of ABS resin is shaped, in the first embodiment, in a square column with open ends.

Inside the frame 2, the cold air gate 3 is formed and also the baffle 4 and the shaft units 4a and 4b of the baffle 4 are housed therein. The cold air gate 3 of the first embodiment is formed, as illustrated in FIG. 1, at an angle to the cold air flow; the cold air gate forming unit 3a projects from the frame 2 at a predetermined angle and surrounds the opening 3b through which cold air flows.

The cold air gate component 3a is formed such that the contact surface 3c projects toward the swinging side of the baffle 4.

Note that in the first embodiment, the cold air gate 3 and the frame 2 are formed integral, but they may be formed separately.

The baffle 4 which contacts and retracts from the contact surface 3c is formed of polycarbonate; a "soft tape" 14 made of expanded polystyrene is attached to the baffle 4 on the side of the cold air gate 3.

The baffle 4 swings around the shaft units 4a and 4b through which the shaft 13 extends; it swings between the position for opening the cold air gate 3 (denoted as the open position hereafter) illustrated by dotted lines and the position for closing the cold air gate 3 (denoted as the closed position 5 hereafter) illustrated by solid lines.

The open position is where the baffle 4 leaves the contact surface 3c and cold air flows in.

The closed position is where the baffle 4 contacts the contact surface 3c and cold air is shut out. Also, at the closed position, the baffle 4 encloses its neighboring region by the frame 2.

A spring engagement unit 4h is formed on the baffle 4 on the side of the cold air gate 3, and one end of a coil spring 15 is engaged therewith. The other end of the coil spring 15 is engaged with a groove 2c formed on the frame 2.

Note that the spring engagement unit 4h is formed at a slightly displaced position from the center of the baffle 4, opposite the journal. The shaft 13 is engaged with the shaft units 4a and 4b of the baffle 4 via some extra space "g" with pins 16. This engagement mechanism is described as follows.

First, baffle 4 illustrated in FIG. 4 is held at an almost identical position to the setting position in the frame 2; a flat unit 13d of the shaft 13 illustrated in FIG. 5 is inserted into a hole 4c formed on the shaft unit 4a in the direction of an arrow a in FIG. 4(A), to assemble the shaft 13 with the through hole 4d of the shaft unit 4a. Note that the pins 16 are inserted into the through holes 13a, 13b, and 13c formed on the shaft 13 in advance to fix them. Then, the shaft 13 is moved to the right direction in FIG. 4(A), and one end of the shaft 13 is inserted into the through hole 4e of the shaft unit 4b.

The baffle 4 now integral with the shaft 13 is mounted on the frame 2. At this time, pins 13 are positioned at three places: one positions the groove 4f at the through hole 13a; one positions the groove 49 at the through hole 13b; and one positions the groove formed at the rotation center 7a of the fan like gear 7 at the through hole 13c.

Figure 6:
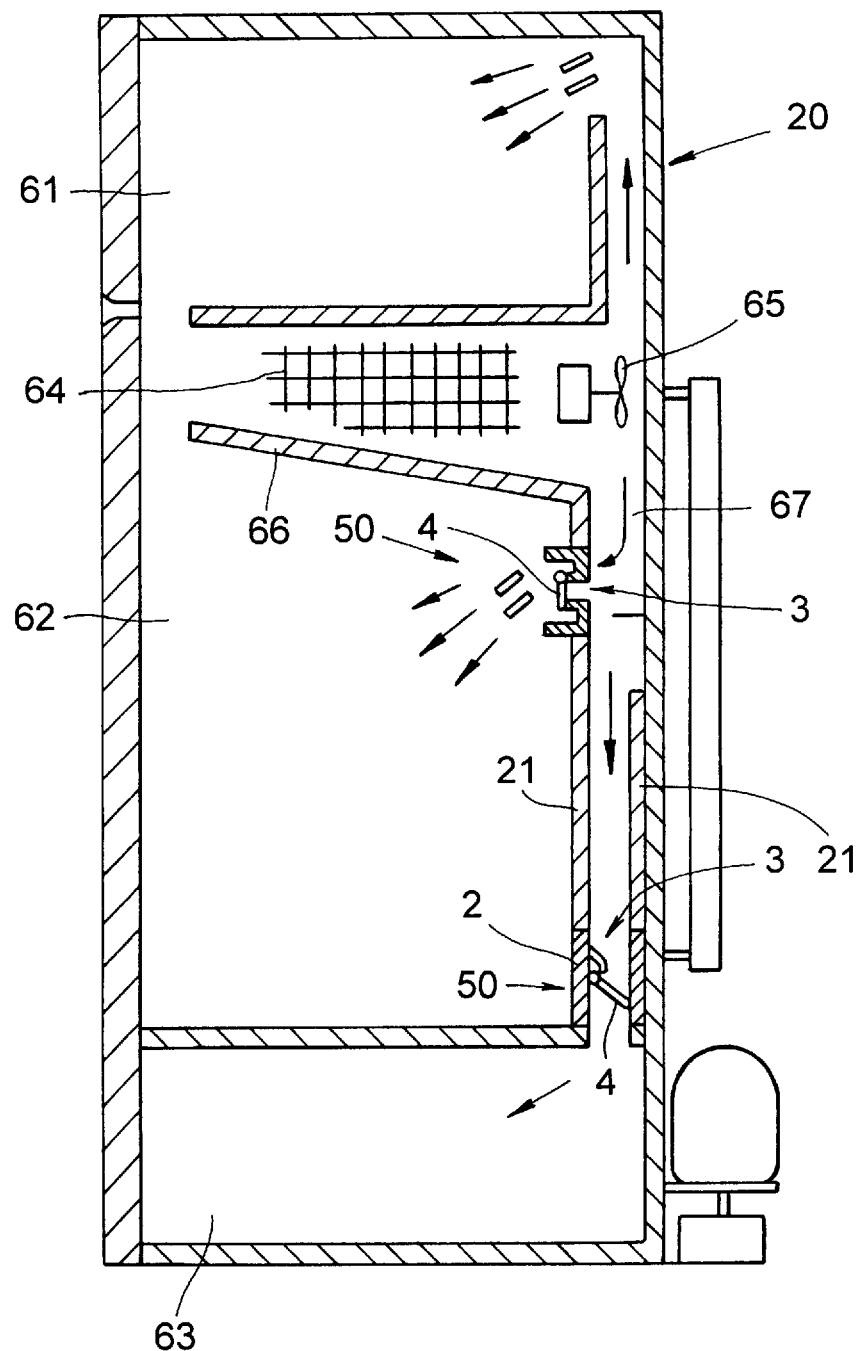
FIG. 6 is a cross-section showing one example of a refrigerator to which the motor damper of this invention is applied.

The above mentioned motor damper 50 is installed, for example, in a refrigerator having a structure as illustrated in FIG. 6.

Briefly describing the refrigerator 20, it is divided into a freezer 61, a refrigerating chamber 62, and a vegetable crisper 63. An evaporator 64 is arranged at the bottom of the freezer 61.

Behind the evaporator 64, a fan motor 65 is arranged, which ventilates and circulates the cold air generated from the evaporator 64.

Between the evaporator 64 and the refrigerating chamber 62, a slanted partition 66 is arranged to prevent the cold air from the evaporator 64 from flowing directly into the refrigerating chamber 62.

Also, between the back, of the slanted partition 66 and the inner wall of the back of the refrigerator 20, a cold air flowing passage 67 is formed in which the damper 50 is arranged.

In the refrigerator 20 illustrated in FIG. 6, a duct 21 having open ends for ventilating the cold air is formed to supply cold air to both the refrigerating chamber 62 and the vegetable crisper 63, and the motor damper 50 is arranged therein.

In other words, in the first embodiment, the frame 2 of the damper 50 is fit in so as to form a part of the duct 21; therefore, the damper 50 itself functions as part of the duct 21.

Next, the movement of the motor damper 50 is described.

The temperature inside the refrigerator 20 is controlled by CPU, etc., which is not illustrated, so that each chamber is maintained within a predetermined temperature range.

In each chamber is arranged, for example, a temperature sensor and the like; based on output signals from the temperature sensor, the above mentioned CPU, etc. generates signals for the motor damper 50 to actuate and control the baffle 4.

First, the movement of the baffle 4 from the closed position to the open position is described.

When the above mentioned CPU, etc. outputs the signals for the stepping motor 1 to actuate the baffle 4, the stepping motor 1 is driven and its rotation is transmitted to the baffle 4 via the pinion 6, fan-like gear 7, shaft 13, shaft units 4a and 4b.

The baffle 4 retracts from the contact 3c against the elasticity of the coil spring 15 and swings to the open position (illustrated by dotted lines in FIG. 1) in parallel to the cold air flow.

When the baffle 4 is swung to the open position, the magnet 8 adhered to the fan-like gear 7 is rotated to the position close to the hall IC (sensor) 9, to actuate the hall IC (sensor) 9. The hall IC (sensor) 9 generates the stop signals for the stepping motor 1 to stop driving the stepping motor 1.

At this time, the elastic force of the coil spring 15 works on the baffle 4 and the baffle 4 tends to swing to the closed position of the cold air 3; however, the energization force or reluctance torque of the stepping motor 1 is strong enough compared to the elastic force to hold the baffle 4 at the open position.

Also, the signal generated from the hall IC (sensor) 9 is the base for setting a home position for the swinging baffle 4. By holding the baffle 4 at the open position, cold air is supplied to the vegetable crisper.

On the other hand, the baffle 4 swings back from the open position to the closed position as follows.

For example, based on the output signals from the temperature sensor and the like arranged in the vegetable crisper 63, the CPU, etc. outputs signals for swinging the baffle 4 to the closed position.

With the above mentioned signal outputs, the stepping motor 1 spins in the direction opposite the previously described movement, then the baffle 4 swings in the direction to contact the contact surface 3c of the cold air gate 3.

The position moved from the home position is detected by counting pulses; when a predetermined number of pulses is reached, the baffle 4 (the position by solid line in FIG. 1) is found at the closed position and driving the stepping motor 1 is stopped.

The stepping motor 1 stops driving after the pin 16 finishes rotating in the extra space "g" even after the soft tape 14 attached to the baffle 4 has contacted the contact surface 3c.

For this reason, the elastic force of the coil spring 15 works on the baffle 4, the soft tape 14 having elastic force is pushed thereon, and the contact surface 3c penetrates the soft tape 14, eliminating the space between the contact surface 3c and the soft tape 14.

The speed with which the baffle 4 swings from the open position (illustrated by dotted lines in FIG. 1) to the closed position (illustrated by solid lines in FIG. 1) is controlled by the rate of pulse generation. For example, in the first embodiment, the baffle swings in 25.8 sec. at 100 pps, in 12.9 sec. at 200 pps, and in 8.6 sec. at 300 pps. It is possible to stop the baffle 4 at a mid-point between the open position and the closed position as an alternate position, rather than at the completely opened position illustrated by dotted lines in FIG. 1.

When setting the above mentioned mid-point as the alternate open position, the baffle 4 is first set to the open position illustrated by dotted lines in FIG. 1, which is the home position, then the stepping motor 1 is stopped at the stage at which a smaller number of pulses is counted for the open position than that of the closed position.

Note that the angle 2 that the baffle 4 swings from the open position (illustrated by dotted lines in FIG. 1) to the closed position (illustrated by solid lines in FIG. 1) is set to be 45° in the first embodiment; however, it is not limited to this angle, and other angles are applicable.

In the first embodiment illustrated in FIGS. 1 through 6, the fact that the cold air gate 3 formed on the frame 2 is slanted against the cold air flow inside the frame 2 allows the baffle 4 to swing within a small angle. It also enables to actuate the coil spring 15, engaging one end of the coil spring 15 with the frame 2 while engaging the other end with the baffle 4. Therefore, placing the coil spring 15 inside the frame 2 permits miniaturization while fully retaining its functionality, ensuring the sealed open status of the baffle 4.

Figure 7:
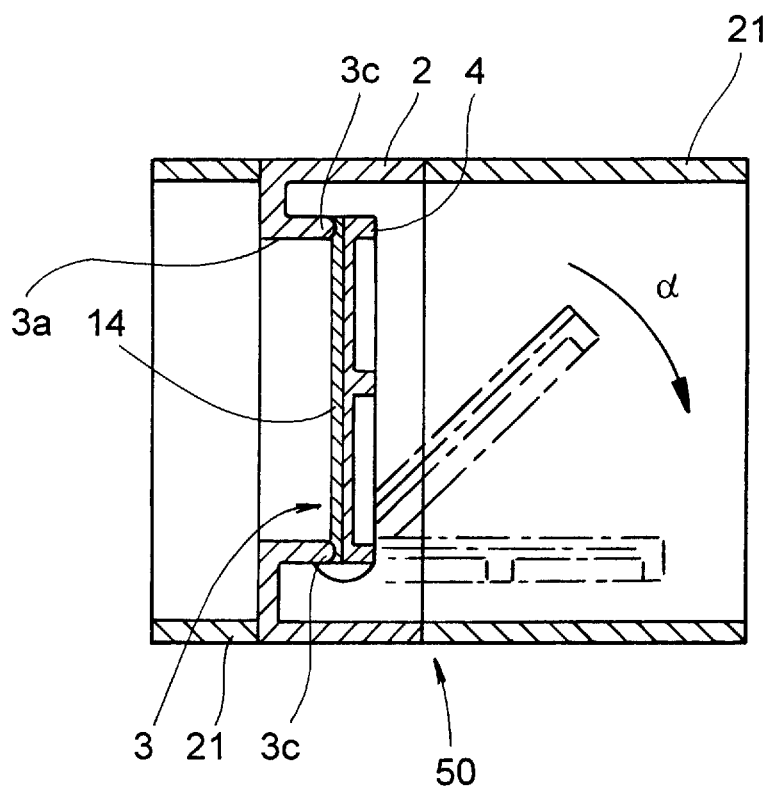
FIG. 7 is a perspective view showing a view of the second embodiment.
Figure 8:
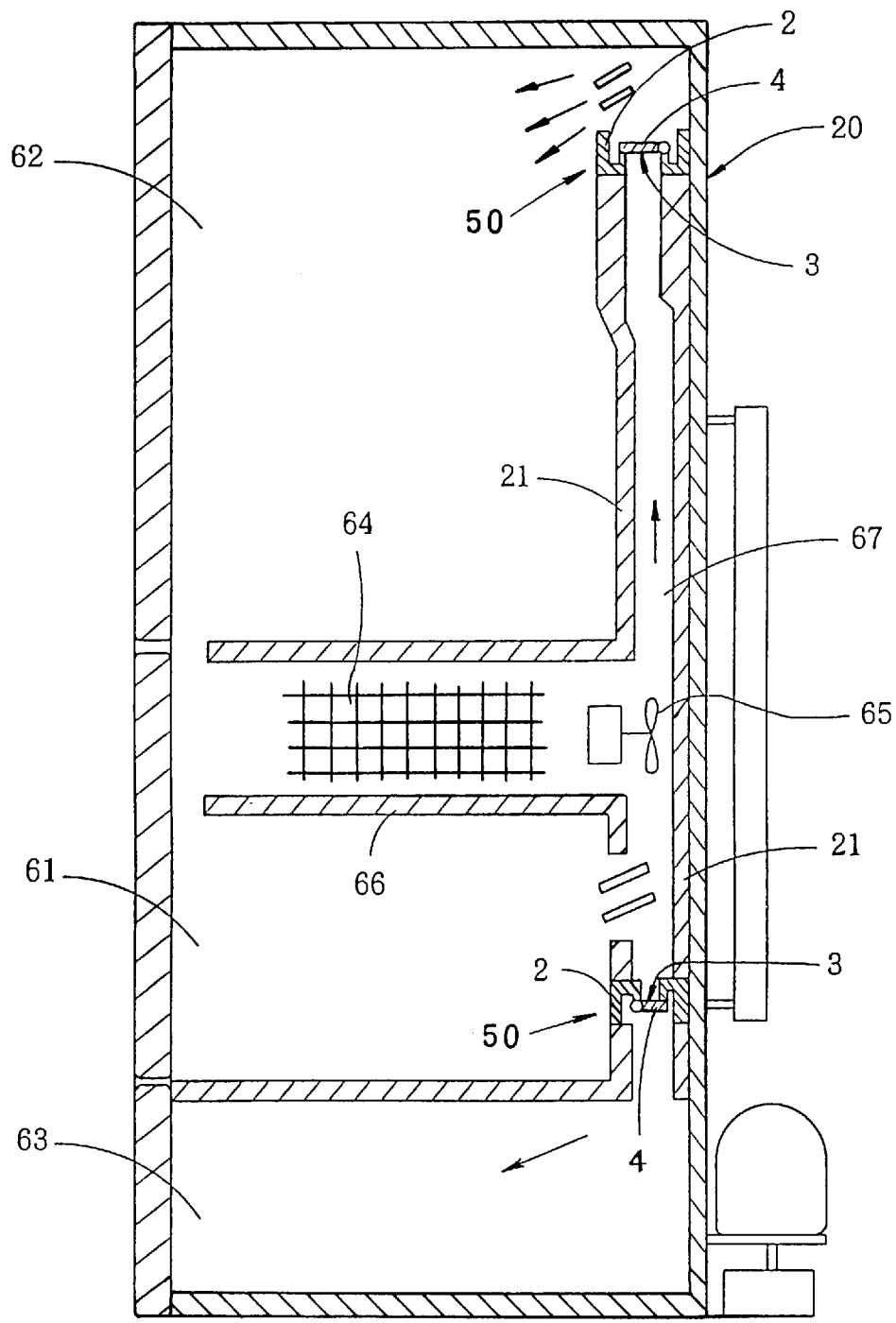
FIG. 8 is a cross-section of a major section showing motor dampers installed in the refrigerator.

Next, the second embodiment of this invention is described, based on FIGS. 7 and 8.

Note that the same elements are referred to with the same numbers as in FIG. 1. Also, the detailed description of the structure of the refrigerator 20 illustrated in FIG. 8 is omitted because it is only the position of the freezer 61 and the refrigerating chamber 62 that is changed.

In the second embodiment, the cold air gate 3 is formed on the frame 2, angled at about 90° with respect to the cold air flow, and the frame 2 is sandwiched by the ducts 21 of the refrigerator 20.

The baffle 4 contacts the gate component 3a of the cold air gate 3, and swings between two positions: the one which shuts the cold air flow (the closed position) and the other which lets the cold air flow (the open position) being in parallel to the cold air flowing in the duct 21.

This movement is actuated by the driving force of the stepping motor 1 arranged at the side of the frame 2. This detail is omitted in the diagram, but by changing the angle between teeth of the fan-like gear 7 illustrated in the first embodiment, the baffle 4 can swing at about 90° from the open position to the closed position. In the second embodiment, a component equivalent to the coil spring 15 in the first embodiment is not used; however, the coil spring 15 may be engaged between the baffle 4 and the duct 21 in the same manner as in the first embodiment. Also, the motor damper 50 illustrated in the second embodiment can be used in the refrigerating chamber 62 having the structure illustrated in FIG. 6.

Figure 9:
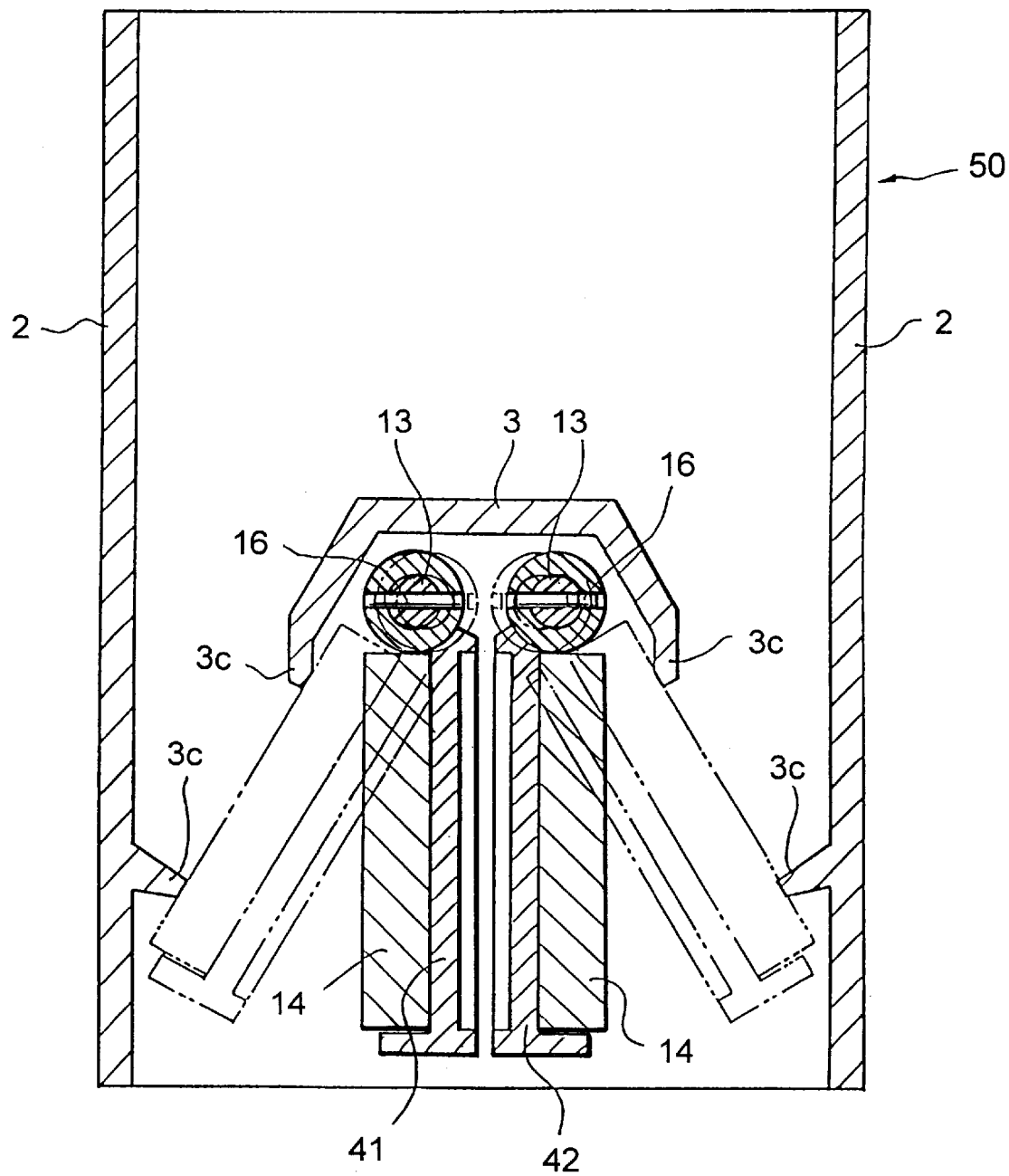
FIG. 9 is a side cross-section of the third embodiment, and corresponds to FIG. 1 representing the first embodiment.

FIG. 9 illustrates the third embodiment of this invention, corresponding to FIG. 1 of the first embodiment. Once again, the identical elements to those in FIG. 1 have the same element numbers.

In the third embodiment, the baffle 4 is arranged at the center area of the frame 2 and also is constructed with two baffles 41 and 42.

Each of the baffles 41 and 42 swings to the open and closed positions using one stepping motor. That is, the spinning force of the stepping motor is transmitted to one of the shafts 13 of the baffles 41 and 42; the rotation of one of the shaft 13 is directly transmitted to the other shaft 13. For this reason, these two may move in the opposite direction, and the opening and closing actions of the baffles 41 and 42 may be synchronized. Other configurations remain the same as in the first embodiment; therefore, the description is omitted herein.

In the third embodiment, each of the baffles 41 and 42 can be driven by using not one but two stepping motors 1 as driving sources.

Such a configuration allows a plurality of open conditions provided by the baffles 41 and 42, thus enabling even more precise control of the cold air supply. In addition, in the second embodiment, the baffles 41 and 42 are arranged at the center of the frame 2, thus providing good balance for a damper.

Figure 10:
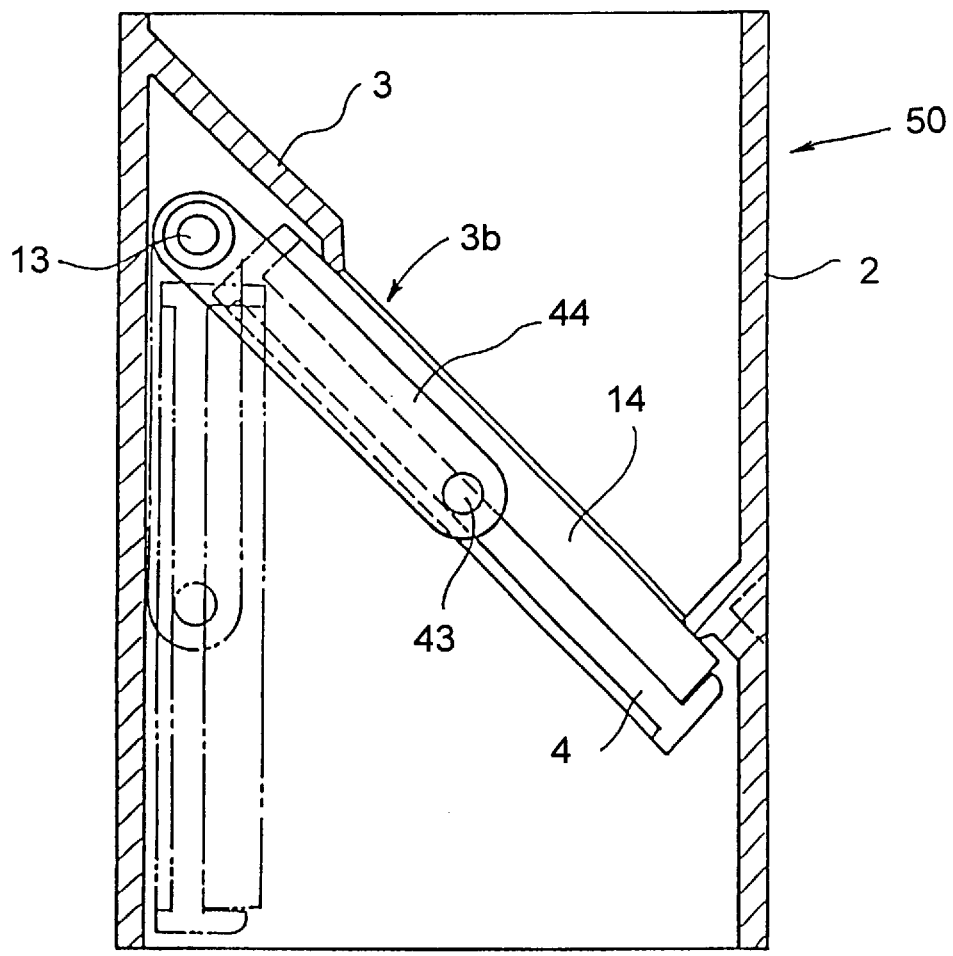
FIG. 10 shows the fourth embodiment, and a cross-sectional side view of the frame and the cold air gate.
Figure 11:
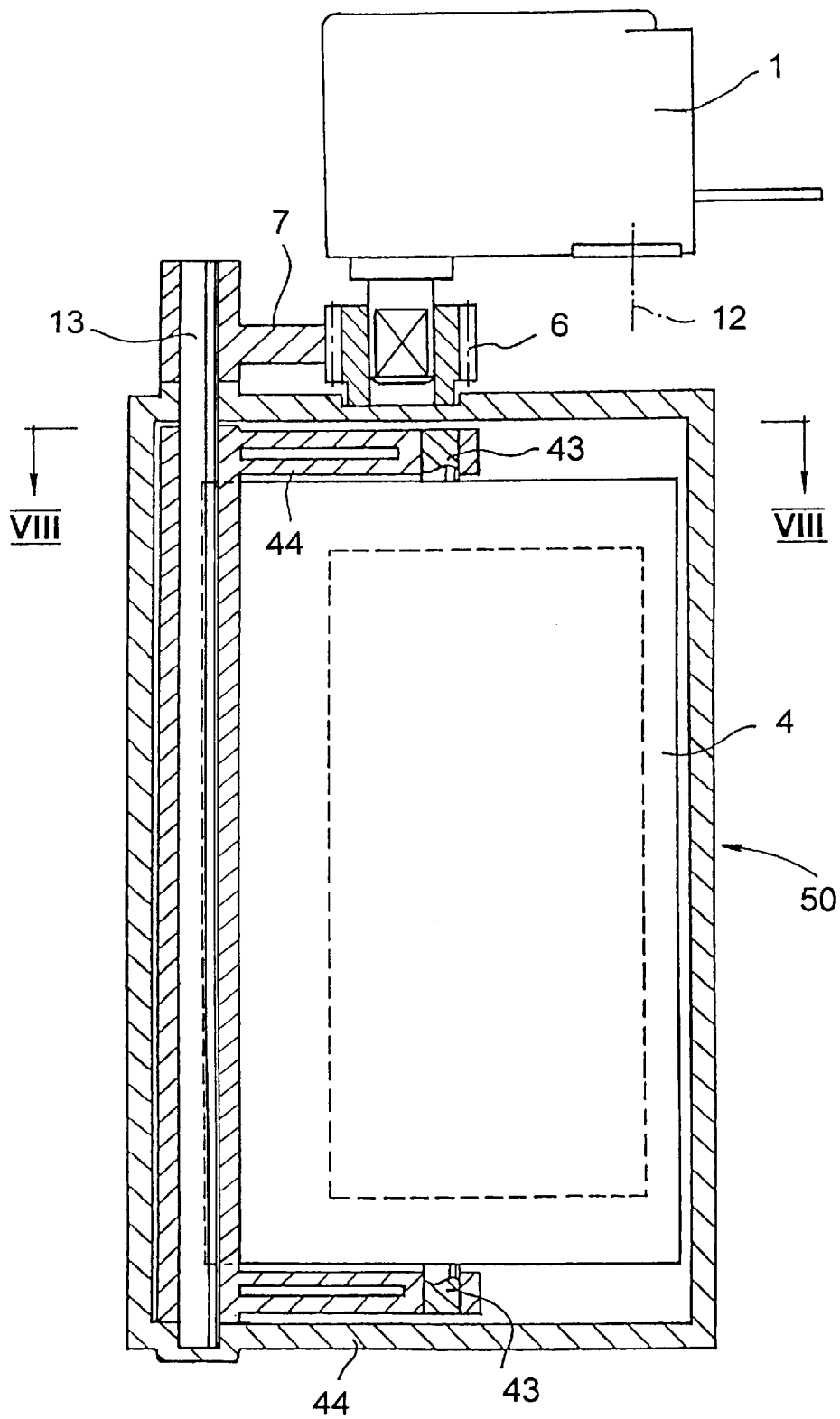
FIG. 11 illustrates a partial cross-sectional view of the bottom of FIG. 10.

FIGS. 10 and 11 illustrate the fourth embodiment of this invention.

In the fourth embodiment, the baffle 4 and its peripheral structure in the first embodiment are modified. FIGS. 10 and 11 respectively correspond to FIGS. 1 and 2; the identical elements as in FIGS. 1 and 2 bear the same element numbers as in FIGS. 10 and 11.

In the fourth embodiment, a baffle supporting shaft 43 is formed in parallel to longer side of the rectangular baffle 4; both ends of the baffle supporting shaft 43 are supported by arms 44 and 44 which corresponds to the functionality of the shaft units 4a and 4b of the baffle 4 illustrated in FIG. 4.

Figure 12:
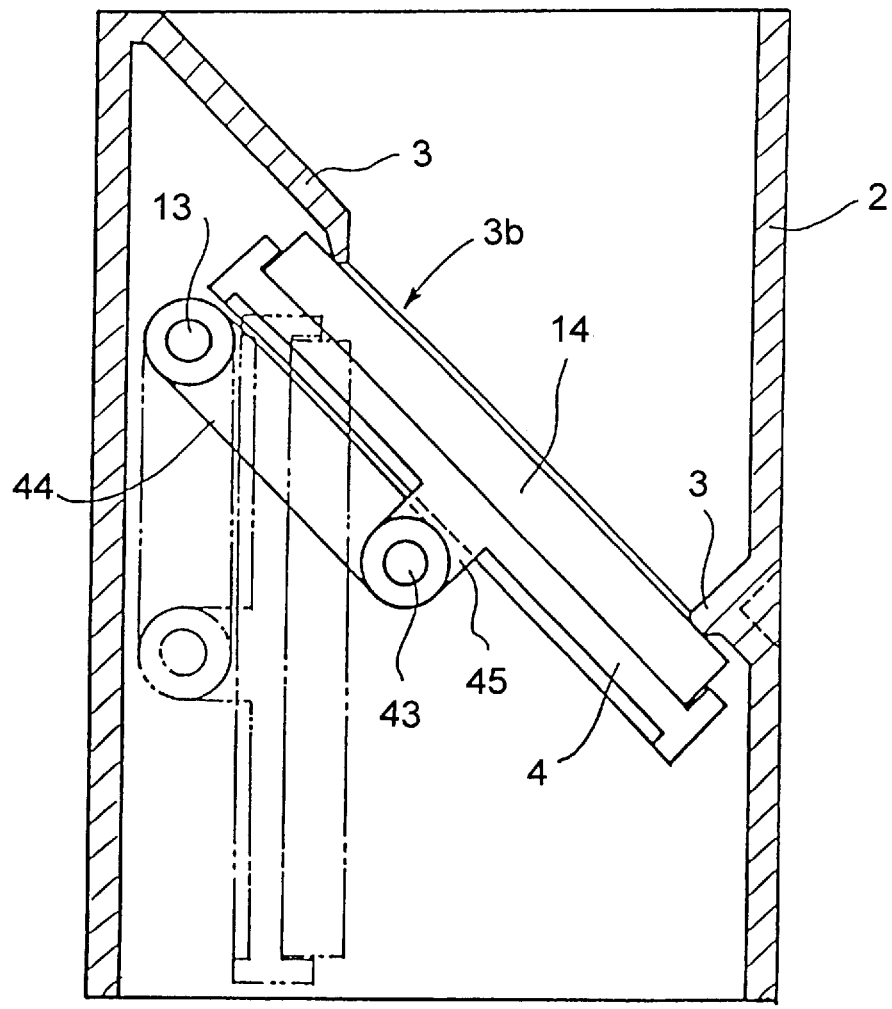
FIG. 12 illustrates the fifth embodiment, and a cross-sectional side view of the frame and the cold air gate.
Figure 13:
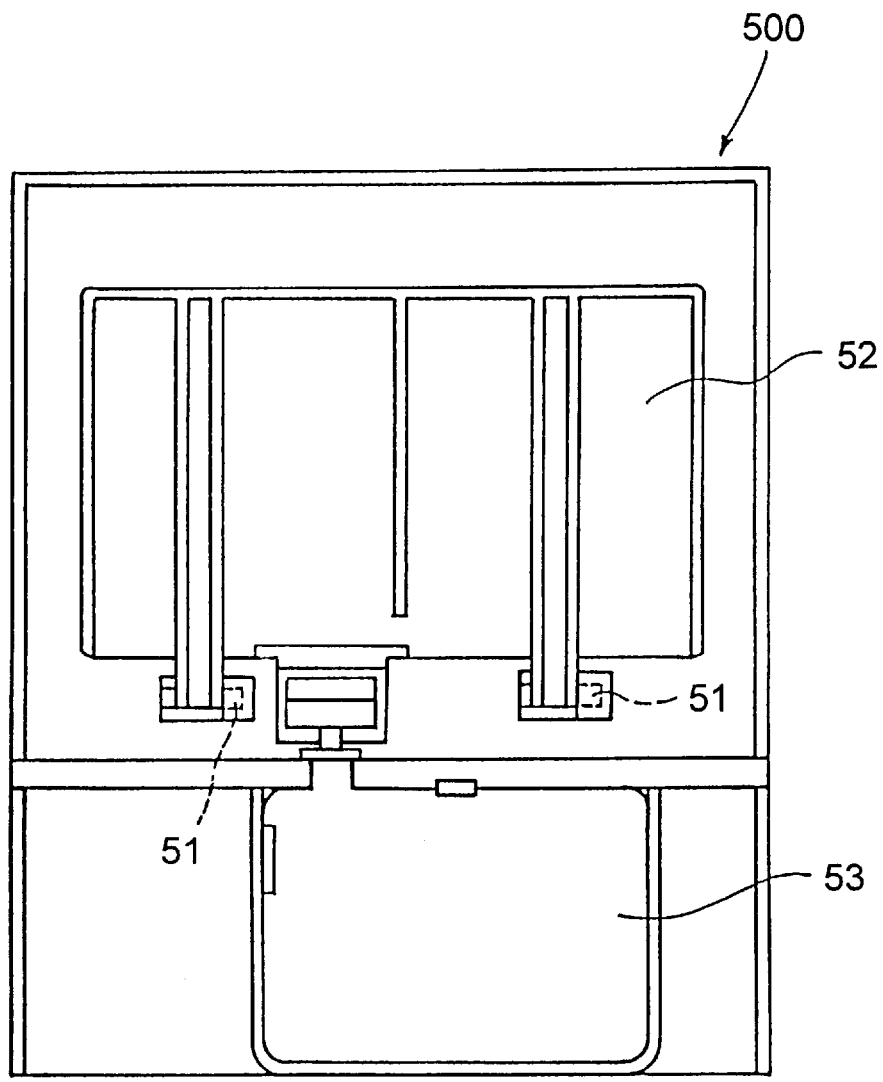
FIG. 13 is a front view of a conventional motor damper.
Figure 14:
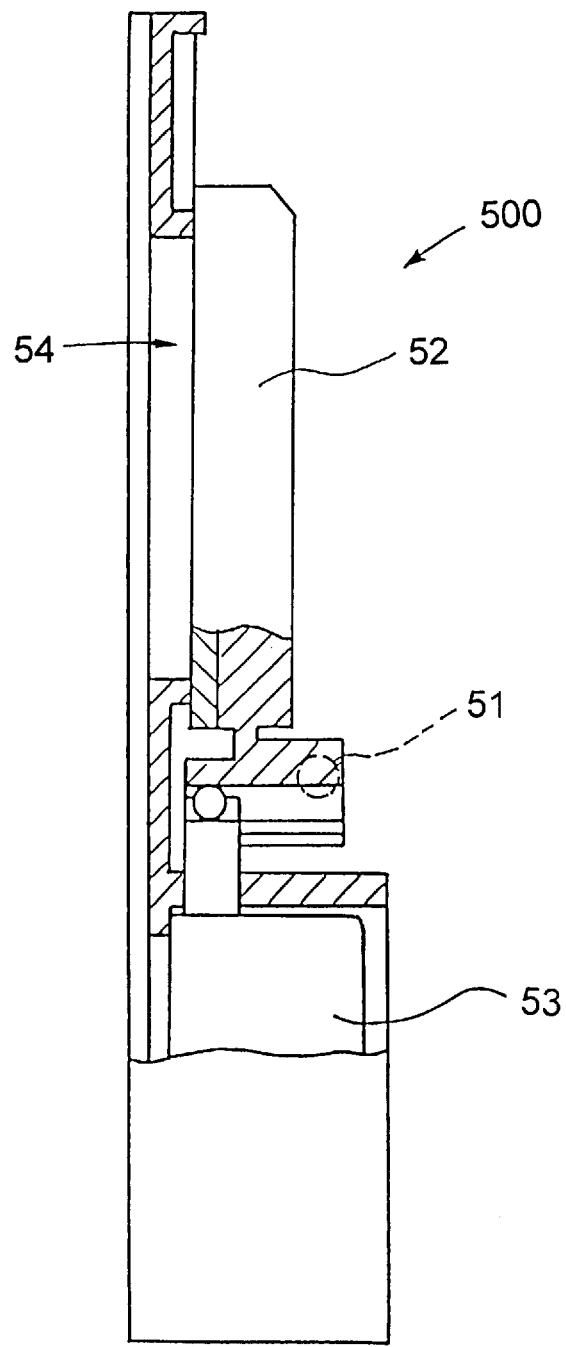
FIG. 14 illustrates a partial side view of FIG. 13.
Figure 15:
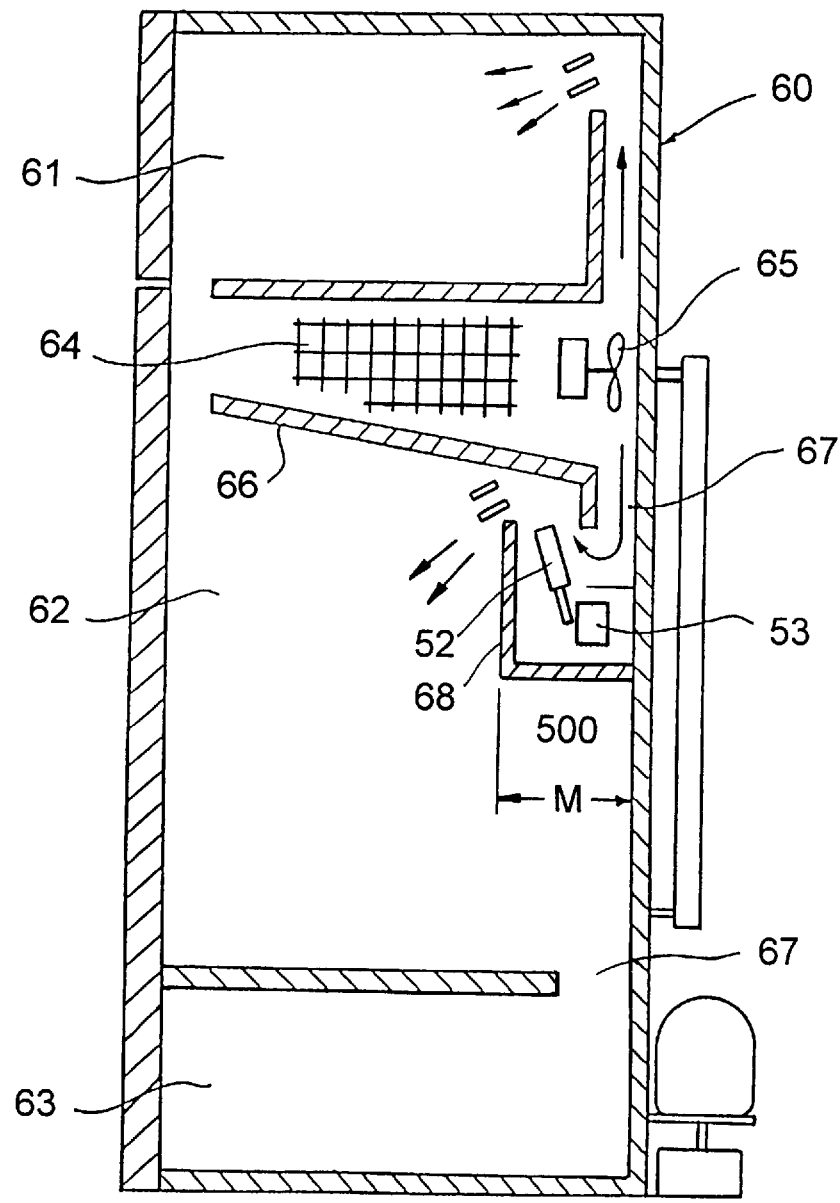
FIG. 15 is a cross-section showing one example of a refrigerator to which the conventional motor damper is applied.
Figures 16A, 16B:
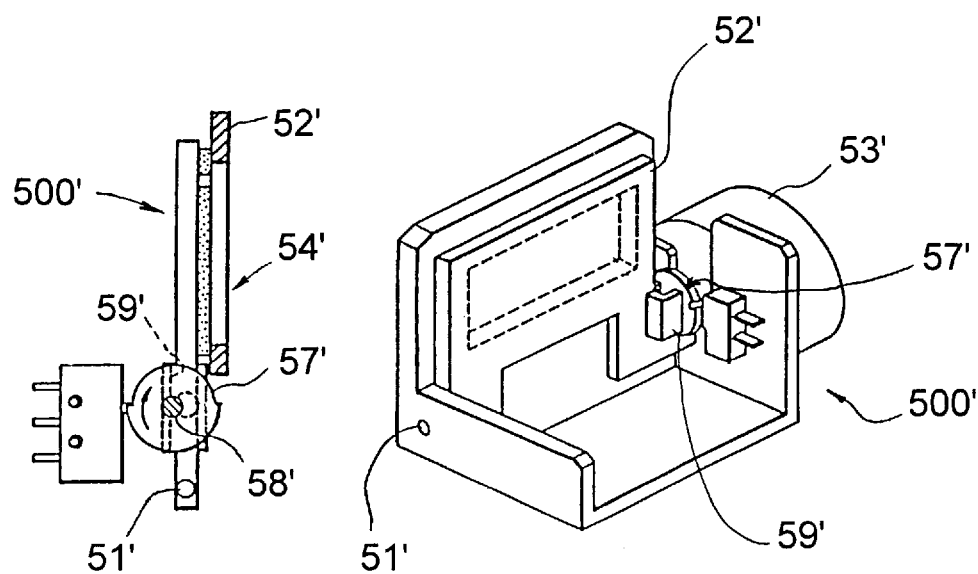
FIGS. 16(A) and 16(B) are respectively a front view and a side view of an alternate conventional motor damper.

Moreover, the peripheral structure of the baffle 4 may be configured as in the fifth embodiment illustrated in FIG. 12. In the fifth embodiment, the baffle supporting shaft 43 illustrated in FIG. 10 goes through a baffle shaft inserting unit 45 projecting toward the back of the baffle 4, and also supported by the arms 44 and 44. With the configuration mentioned above, the motor damper 50 employs the fan-like gear 7 as a decelerating gear for transmitting the rotational force of the stepping motor 1. Therefore, the movement of the fan like gear 7 easily stays inside the side space of the frame 2.

Further, the mechanism by which the driving force of the stepping motor 1 is transmitted to the fan-like gear 7 increases the rotation torque of the motor. Thus, one can easily obtain a compact motor damper actuator having a large driving force.

Also, by making the frame 2 as almost a square column, the damper 50 can be installed in a square column duct that is widely used for the duct of refrigerators 20 and the like, thus broadening its applicability.

In addition, forming the frame 2 as a part of the duct of the refrigerator 20 allows building it in and the like without deforming the duct portion of the refrigerator 20 and thus is preferable.

Note that each of the above mentioned embodiments is a suitable example form of this invention, but the invention is not limited to these. The embodiments are variously modifiable within the scope of this invention. For example, the movement mechanism may be arranged inside the duct wall of the refrigerator.

In other words, the cover 11 may function as the duct wall of the refrigerator.

Also, the damper 4 may be moved to the open position by the motor while it is moved to the closed position by the elastic potential energy of a coil spring and the like. Further, as the motor may be used not only the stepping motor 1 but also other motors such as an AC synchronous motor or a DC motor.

In place of the coil spring 15, a flat spring or a magnet may be used, or may, on occasion, be omitted. The fan-like gear 7 is used as a decelerating gear, but other gears may be used as well.

Moreover, the above mentioned embodiments showed the motor damper of this invention used as a cold air control in a refrigerator; however, this invention may also be used in other machines dealing with fluids, such as air conditioning or a water supply.

As described above, in a motor damper of this invention arranged in a passage in a refrigerator through which cold air flows, the rotation shaft of a baffle for closing or opening the cold air gate is rotatably secured to the rotation shaft of a motor, so that the baffle swings between the closed position and the open position of the cold air gate. With this structure, the damper can be miniaturized, and the cold air gate is completely opened.

Also, the above mentioned structure does not interrupt the cold air flowing along the frame, and lets it flow straight, eliminating the chance of loosing cold air during transmission and allowing cold air to flow smoothly. Thus, a refrigerator having an effective transmission and diffusion means for cold air can be easily obtained.

Moreover, in the motor damper of this invention, the cold air gate which the baffle contacts and retracts from opening and closing the gate is formed in the frame constituting a part of the passage through which the cold air flows. Also, the baffle is arranged such that the circumference of the baffle is enclosed by the frame when the baffle closes the cold air gate; therefore, the space usually lost in accommodating the motor damper in a refrigerator and the like is reduced.

In addition, because the cold air gate is formed inside the frame, and also because the movement mechanism including the motor for swinging the baffle is installed at a side of the frame, the cold air gate can be made large. The movement mechanism for swinging the baffle is small enough to provide enough space for the cold air gate. Thus, the miniaturized motor damper having the large cold air gate can be provided.

While the foregoing description and drawings represent the preferred embodiments of the present invention, it will be obvious to those skilled in the art that various changes and modifications may be made therein without departing from the true spirit and scope of the present invention.

What is claimed is:

1. A motor damper arranged in a passage in a refrigerator through which cold air flows, comprising:

a frame constituting a part of said passage;

a cold air gate formed at the center of said frame;

a baffle, rotatably secured on a rotation shaft formed on said frame, for opening and closing said cold air gate;

a rotation mechanism for swinging said baffle between open and closed positions of said cold air gate;

said baffle being arranged to enclose a neighboring region by said frame at the position it closes said cold air gate;

said rotation mechanism including a motor arranged outside said frame and in the vicinity of said rotation shaft of said baffle; and an output shaft of said motor being rotatably secured to said rotation shaft of said baffle.

2. A motor damper according to claim 1, wherein said output shaft of said motor is attached to said rotation shaft of said baffle via a decelerating gear.

3. A motor damper according to claim 2, wherein said baffle is rotatable to the position at which said cold air gate completely opens.

4. A motor damper according to claim 3, wherein said baffle is rotatable by about 90° from the closed position to the open position of said cold air gate.

5. A motor damper according to claim 1, wherein said motor is a stepping motor.

6. A motor damper according to claim 1, wherein a tip of said baffle overlaps said frame when said baffle closes said cold air gate, and the tip of said baffle is exposed outside said frame when said baffle opens said cold air gate.

7. A motor damper according to claim 1, wherein said cold air gate is arranged on said frame in such a way that the position which said baffle closes said cold air gate is slanted with respect to said cold air flow.

8. A motor damper according to claim 1, comprising two baffles arranged in about the center of said passage in said frame.

9. A motor damper arranged in a passage in a refrigerator through which cold air flows, comprising:

a frame constituting a part of said passage;

a cold air gate formed at the center of said frame;

a baffle, rotatably secured on a rotation shaft formed on said frame, for opening and closing said cold air gate;

a rotation mechanism for swinging said baffle between open and closed positions of said cold air gate;

said baffle being arranged to enclose a neighboring region by said frame at the position it closes said cold air gate; and said rotation mechanism including a motor arranged outside said frame and in the vicinity of said rotation shaft of said baffle, said rotation mechanism including a stepping motor, a pinion fit to an output shaft of said stepping motor, a fan-like gear engaged with said pinion, and a shaft for fitting one end to said fan-like gear and for engaging another end with said baffles;

said output shaft of said motor being rotatably secured to said rotation shaft of said baffle.

10. A motor damper according to claim 9, wherein one end of a spring is attached to said baffle on the side of said cold air gate and another end of said spring is attached to said frame.

11. A motor damper according to claim 9, wherein said baffle is engaged with said shaft in a manner so as to provide a certain space therebetween.

12. A motor damper arranged in a passage in a refrigerator through which cold air flows, comprising:

a frame constituting a part of said passage;

a cold air gate formed at the center of said frame;

a baffle, rotatably secured on a rotation shaft formed on said frame, for opening and closing said cold air gate;

a rotation mechanism for swinging said baffle between open and closed positions of said cold air gate;

said baffle being arranged to enclose a neighboring region by said frame at the position it closes said cold air gate; and said rotation mechanism including a motor arranged outside said frame and in the vicinity of said rotation shaft of said baffle, said rotation mechanism including a stepping motor, a pinion fit to an output shaft of said stepping motor, a fan-like gear engaged with said pinion, and a shaft for fitting one end to said fan-like gear and for engaging another end with said baffle, said output shaft of said motor being rotatably secured to said rotation shaft of said baffle;

a magnet adhered to one end of said fan-like gear; and a sensor attached to said frame in the vicinity of said magnet for detecting an approach of said magnet.

13. A motor damper according to claim 12, wherein said sensor is a Hall-effect integrated circuit.

* * * * *

EX PARTE REEXAMINATION CERTIFICATE (6088th)

United States Patent
Noritake et al.

(10) Number: US 5,876,014 C1
(45) Certificate Issued: Jan. 8, 2008

(54) MOTOR DAMPER

(75) Inventors: Seiichiro Noritake, Nagano (JP); Yoshinori Shinohara, Nagano (JP)

(73) Assignee: Sankyo Seiki Mfg. Co., Ltd., Suwa-Gun, Nagano-Ken (JP)

Reexamination Request:
No. 90/007,438, Feb. 25, 2005

Reexamination Certificate for:
Patent No.: 5,876,014
Issued: Mar. 2, 1999
Appl. No.: 08/704,911
Filed: Aug. 30, 1996

(30) Foreign Application Priority Data

Sep. 13, 1995 (JP) .............................. 7-260882
Feb. 16, 1996 (JP) .............................. 8-054201

(51) Int. Cl.
F16K 31/04 (2006.01)
F16K 31/02 (2006.01)
F25D 17/04 (2006.01)
F24F 13/14 (2006.01)

(52) U.S. Cl. .................... 251/129.12; 251/303; 62/187; 62/408

(58) Field of Classification Search ............. 251/129.11, 251/129.12, 313, 303; 62/187, 408
See application file for complete search history.

(56) References Cited

U.S. PATENT DOCUMENTS

| | | |
|---|---|---|
| 3,108,452 A | 10/1963 | Breen |
| 3,288,370 A | 11/1966 | Mingrone et al. |
| 4,083,256 A | 4/1978 | Shio |
| 4,511,832 A | 4/1985 | Schmitz |
| 4,689,966 A | 9/1987 | Nonaka |
| 4,957,274 A | 9/1990 | Hood et al. |
| 5,202,597 A | 4/1993 | Ishida et al. |

FOREIGN PATENT DOCUMENTS

| | | |
|---|---|---|
| DE | 27 00 928 | 9/1976 |
| EP | 592003 A1 * | 4/1994 |
| JP | 63-63675 | 4/1988 |
| JP | 64-3485 | 1/1989 |
| JP | 64-48571 | 3/1989 |
| KR | U1993-000150 | 1/1993 |

OTHER PUBLICATIONS

Bird, J. and Ross, C., Mechanical Engineering Principles, Oxford, Newnes, 2002. p. 203.*

* cited by examiner

*Primary Examiner*—Sara S Clarke

(57) ABSTRACT

A motor damper arranged in a passage in a refrigerator through which the cold air flows comprises a frame constituting a part of the passage, a cold air gate formed at the center of the frame, a baffle rotatably secured on a rotation shaft formed on the frame for opening and closing the cold air gate and a rotation mechanism for swinging the baffle between open and closed positions of the cold air gate. The baffle is arranged to enclose a neighboring region by the frame at the position it closes the cold air gate. The rotation mechanism includes a motor arranged outside the frame and in the vicinity of the rotation shaft of the baffle. The motor damper also includes an output shaft of the motor which is rotatably secured to the rotation shaft of the baffle.

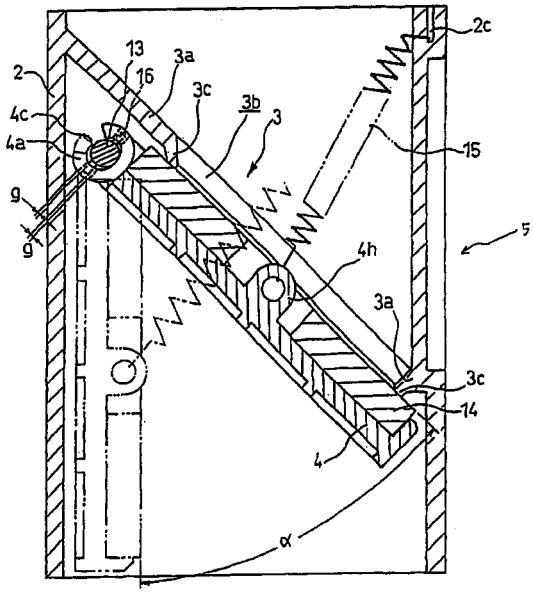
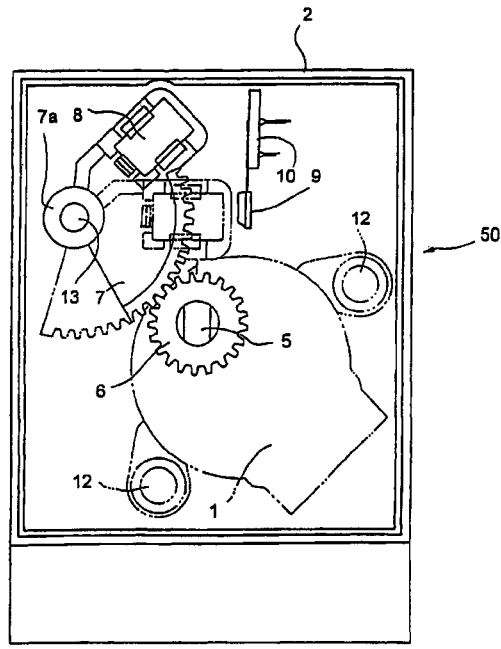

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 12 and 13 is confirmed.

Claims 1–5, 8–9 and 11 are cancelled.

Claims 6, 7 and 10 are determined to be patentable as amended.

New claims 14–17 are added and determined to be patentable.

6. A motor damper [according to claim 1,] *arranged in a passage in a refrigerator through which cold air flows, comprising:*

*a frame constituting a part of said passage;*

*a cold air gate formed at the center of said frame;*

*a baffle, rotatably secured on a rotation shaft formed on said frame, for opening and closing said cold air gate;*

*a rotation mechanism for swinging said baffle between open and closed positions of said cold air gate;*

*said baffle being arranged to enclose a neighboring region by said frame at the position it closes said cold air gate;*

*said rotation mechanism including a motor arranged outside said frame and in the vicinity of said rotation shaft of said baffle; and*

*an output shaft of said motor being rotatably secured to said rotation shaft of said baffle, and* wherein a tip of said baffle overlaps said frame when said baffle closes said cold air gate, and the tip of said baffle is exposed outside said frame when said baffle opens said cold air gate.

7. A motor damper [according to claim 1,] *arranged in a passage in a refrigerator through which cold air flows, comprising:*

*a frame constituting a part of said passage;*

*a cold air gate formed at the center of said frame;*

*a baffle, rotatably secured on a rotation shaft formed on said frame, for opening and closing said cold air gate;*

*a rotation mechanism for swinging said baffle between open and closed positions of said cold air gate;*

*said baffle being arranged to enclose a neighboring region by said frame at the position it closes said cold air gate;*

*said rotation mechanism including a motor arranged outside said frame and in the vicinity of said rotation shaft of said baffle; and*

*an output shaft of said motor being rotatably secured to said rotation shaft of said baffle, and* wherein said cold air gate is arranged on said frame in such a way that the position which said baffle closes said cold air gate is slanted with respect to said cold air flow.

10. A motor damper [according to claim 9,] *arranged in a passage in a refrigerator through which cold air flows, comprising:*

*a frame constituting a part of said passage;*

*a cold air gate formed at the center of said frame;*

*a baffle, rotatably secured on a rotation shaft formed on said frame, for opening and closing said cold air gate;*

*a rotation mechanism for swinging said baffle between open and closed positions of said cold air gate;*

*said baffle being arranged to enclose a neighboring region by said frame at the position it closes said cold air gate; and*

*said rotation mechanism including a motor arranged outside said frame and in the vicinity of said rotation shaft of said baffle, said rotation mechanism including a stepping motor, a pinion fit to an output shaft of said stepping motor, a fan-like gear engaged with said pinion, and a shaft for fitting one end to said fan-like gear and for engaging another end with said baffles;*

*said output shaft of said motor being rotatably secured to said rotation shaft of said baffle, and* wherein one end of a spring is attached to said baffle on the side of said cold air gate and another end of said spring is attached to said frame.

*14. A motor damper according to claim 12, wherein the frame includes a surrounding portion that surrounds the baffle so as to be capable of accommodating the baffle within a space formed by the surrounding portion of the frame when the baffle closes the cold air gate.*

*15. A motor damper arranged in a passage in a refrigerator through which cold air flows, comprising:*

*a frame constituting a part of said passage;*

*a cold air gate formed at the center of said frame;*

*a baffle, rotatably secured on a rotation shaft formed on said frame, for opening and closing said cold air gate;*

*a rotation mechanism for swinging said baffle between open and closed positions of said cold air gate;*

*said baffle being arranged to enclose a neighboring region by said frame at the position it closes said cold air gate;*

*said rotation mechanism including a motor arranged outside said frame and in the vicinity of said rotation shaft of said baffle; and*

*an output shaft of said motor being rotatably secured to said rotation shaft of said baffle,*

*wherein the frame includes a surrounding portion that surrounds the baffle so as to be capable of accommodating the baffle within a space formed by the surrounding portion of the frame when the baffle closes the cold air gate, and*

*wherein a tip of the baffle is protruded outside from the space formed by the surrounding portion of the frame when the baffle opens the cold air gate.*

*16. A motor damper arranged in a passage in a refrigerator through which cold air flows, comprising:*

*a frame constituting a part of said passage;*

*a cold air gate formed at the center of said frame;*

*a baffle, rotatably secured on a rotation shaft formed on said frame, for opening and closing said cold air gate;*

*a rotation mechanism for swinging said baffle between open and closed positions of said cold air gate;*

*said baffle being arranged to enclose a neighboring region by said frame at the position it closes said cold air gate; and* said rotation mechanism including a motor arranged outside said frame and in the vicinity of said rotation shaft of said baffle, said rotation mechanism including a stepping motor, a pinion fit to an output shaft of said stepping motor, a fan-like gear engaged with said pinion, and a shaft for fitting one end to said fan-like gear and for engaging another end with said baffles;

said output shaft of said motor being rotatably secured to said rotation shaft of said baffle, wherein the frame includes a surrounding portion that surrounds the baffle so as to be capable of accommodating the baffle within a space formed by the surrounding portion of the frame when the baffle closes the cold air gate, and wherein a tip of the baffle is protruded outside form the space formed by the surrounding portion of the frame when the baffle opens the cold air gate.

17. A motor damper arranged in a passage in a refrigerator through which cold air flows, comprising:

a frame constituting a part of said passage;

a cold air gate formed at the center of said frame;

a baffle, rotatably secured on a rotation shaft formed on said frame, for opening and closing said cold air gate;

a rotation mechanism for swinging said baffle between open and closed positions of said cold air gate;

said baffle being arranged to enclose a neighboring region by said frame at the position it closes said cold air gate; and said rotation mechanism including a motor arranged outside said frame and in the vicinity of said rotation shaft of said baffle, said rotation mechanism including a stepping motor, a pinion fit to an output shaft of said stepping motor, a fan-like gear engaged with said pinion, and a shaft for fitting one end to said fan-like gear and for engaging another end with said baffles;

said output shaft of said motor being rotatably secured to said rotation shaft of said baffle, wherein the frame includes a surrounding portion that surrounds the baffle so as to be capable of accommodating the baffle within a space formed by the surrounding portion of the frame when the baffle closes the cold air gate, and wherein a tip of the baffle is protruded outside from the space formed by the surrounding portion of the frame when the baffle opens the cold air gate.

\* \* \* \* \*